Figure 1:
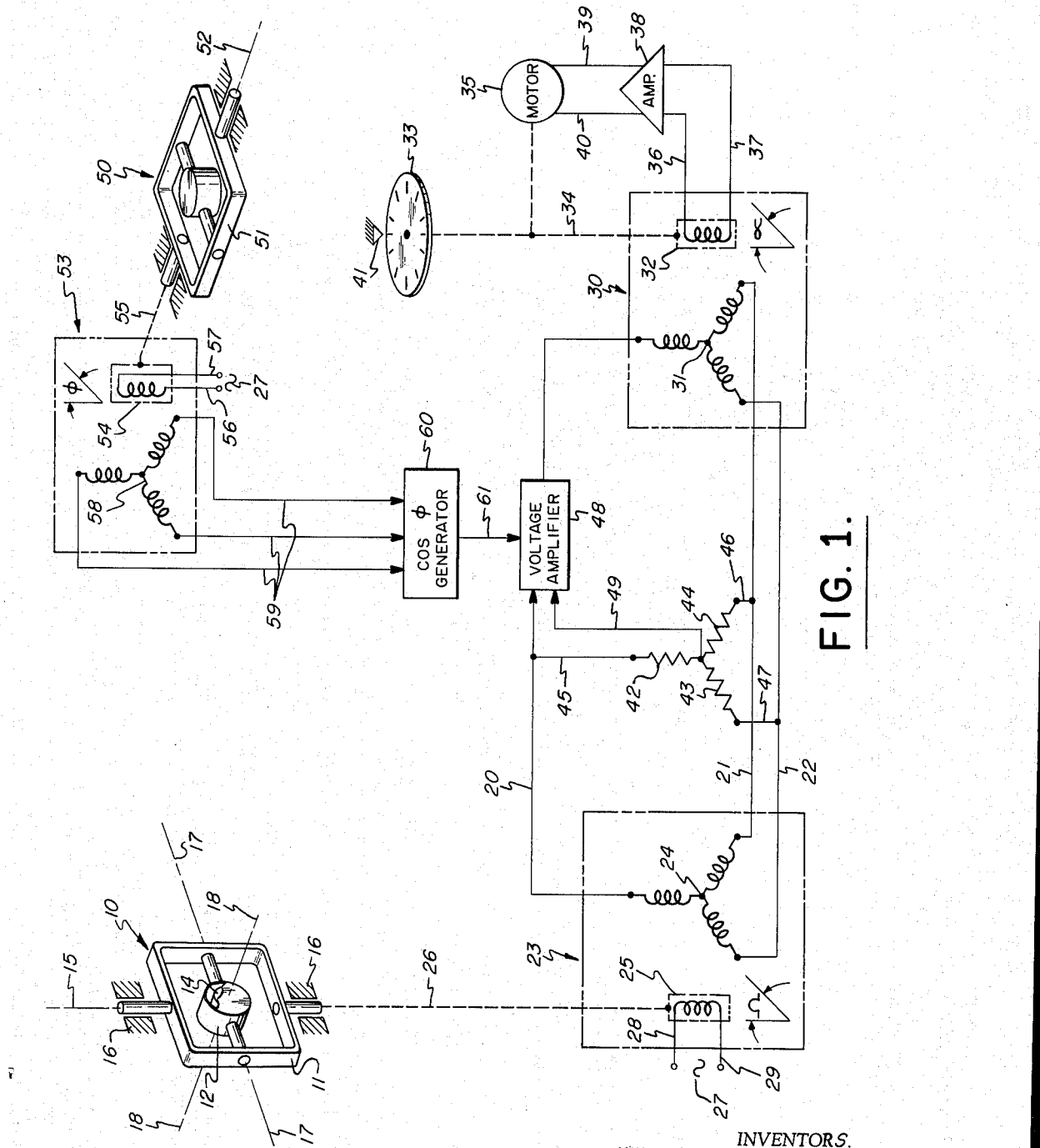

INVENTORS.
WILLIAM W. BURMEISTER
RICHARD K. RADTKE
BY
Arthur H. Serrell
ATTORNEY United States Patent Office 3,234,444
Patented Feb. 8, 1966

3,234,444
GIMBAL ERROR COMPENSATING SYSTEM
William W. Burmeister and Richard K. Radtke, Phoenix, Ariz., assignors to Sperry Rand Corporation, Great Neck, N.Y., a corporation of Delaware
Filed Mar. 18, 1963, Ser. No. 265,743
8 Claims. (Cl. 318—30)

This invention relates to gyroscopically stabilized data transmission systems for dirigible craft in which the output of the system is compensated for gimbal errors by varying the gain of a voltage amplifier in accordance with a function of the tilt of the craft from a level condition about an axis. The provided output data may be directional in character with the system including a compass card and a gyroscopic element that may be slaved to a directional reference such as the earth's magnetic field.

In transmission systems of the character described in which a polycircuit A.C. line connects transmitter and receiver elements and where the reference gyroscope is a directional gyro with a gimbal stabilized about a normally vertical axis with relation to the craft, the noted error which is two cycle in character varies between maximum and minimum values depending on the angular relation of the craft with respect to the gimbal about the gimbal axis and the tilt of the craft from a level condition about its roll axis. For conditions where the spin axis of the rotor of the stabilizing gyroscope is in alignment with either the fore and aft or pitch axis of the craft, the gimbal error is at its minimum value or zero as tilt of the craft about its roll axis under such angular condition does not exert a disturbing influence on the gimbal. The maximum gimbal error is produced four times as the heading of the craft swings through 360 degrees at angular positions in the turn where the spin axis of the rotor of the stabilizing gyroscope is located in approximately 45-degree spaced relation to the fore and aft and pitch axes of the craft. At the noted positions, the disturbing influence on the gimbal due to the tilt of the craft is greatest, the influence and resulting error varying in magnitude in accordance with the following equation:

$$\tan E = \frac{(\cos \phi - 1) \tan \Omega}{1 + \tan^2 \Omega \cos \phi}$$

where $E$ is the gimbal error
$\phi$ is the roll angle of the craft, and
$\Omega$ is the actual heading angle of the craft.

The improved system makes no provisions for gimbal error output due to tilt of the craft about its pitch axis where the gyro is directional in character as this error is relatively insignificant. However, this invention can be implemented to compensate for pitch gimbal error, where it does not compensate for roll error.

An object of the present invention is to provide a compensating change in the voltage of one of the branches of a polycircuit data transmission line to obtain the desired result.

One of the features of the invention resides in the utilization in the compensating means structure of a network of resistors that are connected across each of the branches of the included polycircuit transmission line.

Another feature of the invention resides in the inclusion in the compensating means structure of a voltage amplifier of the variable gain type for the compensating branch of the line arranged in connected input relation across the resistor of the provided network related to the compensating branch.

A further feature of the invention is provided by the means included in the compensating structure for varying the gain of the voltage amplifier as a function of the tilt of the craft about an axis normal to the gimbal axis of the included stabilizing gyroscope.

Figure 2:
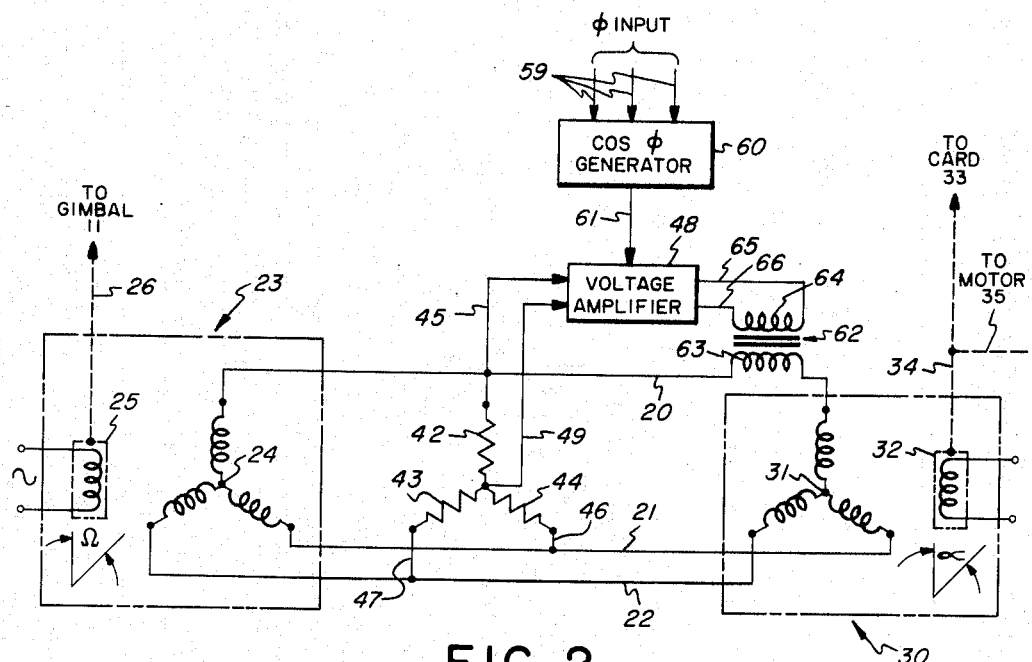
Figure 3:
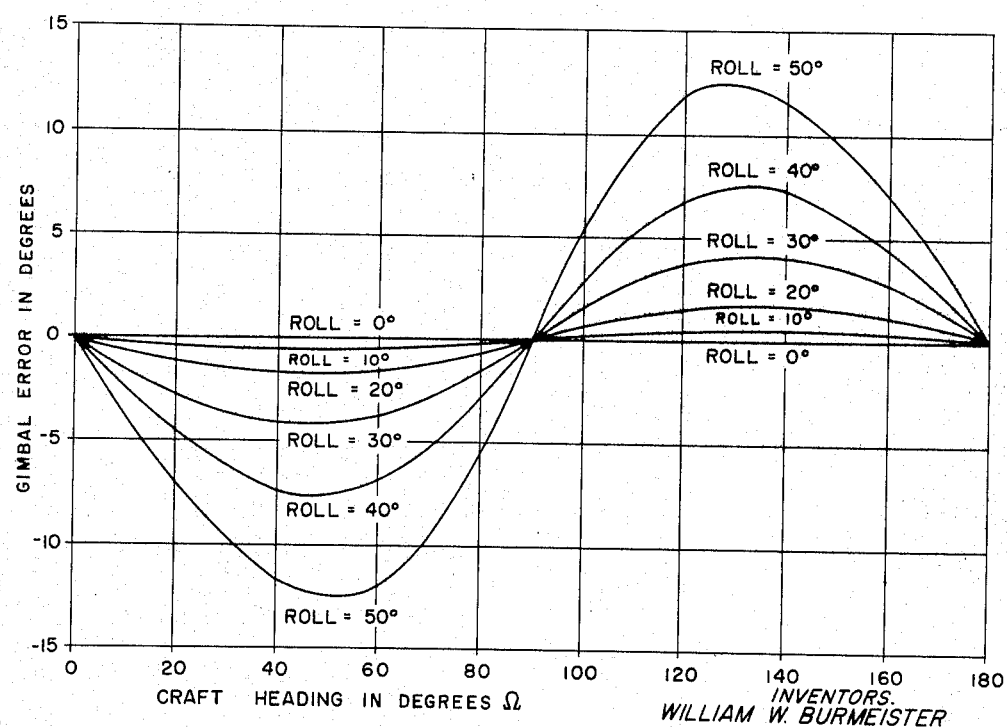

Other objects, features and structural details of the invention are hereinafter set forth in the following description in connection with the accompanying drawings, in which:

FIG. 1 is a diagrammatic view and wiring diagram showing the gyroscopic and electrical elements of the improved system in connected relation in an A.C. polycircuit transmission line;

FIG. 2 is a view similar to FIG. 1 showing a modification of the improved system in which the output of the voltage amplifier is coupled to the compensating branch of the transmission line through a transformer; and FIG. 3 is a graph with curves representing the gimbal error in degrees in the transmitter output of the system for respective roll tilts of 10, 20, 30, 40 and 50-degree angles through a range of 180 degrees change in heading of the craft.

In the embodiment of the invention shown in the drawing, the stabilizing gyroscope is represented as a directional gyro 10 with gimbal 11, case or frame member 12 and rotor 14 parts. As arranged with respect to the craft on which the provided gyroscopic means is mounted, the gimbal or ring part 11 is mounted with freedom about a normally vertical axis 15 fixed in relation to the craft. The axis 15 is provided by the cooperating trunnions of the gimbal and a bearing housing 16 that moves with the craft as the craft yaws or turns in azimuth through a range of 360 degrees. To maintain the orientation of the gyroscopic means shown, it may be slaved to a suitable directional reference such as the earth's magnetic field. Gimbal axis 15 corresponds with or is parallel to the yaw axis of the craft so that the gyroscopic means per se establishes the necessary base line from which data representative of the heading of the craft is provided as an output in the improved system. As shown in FIG. 1, the frame or case member 12 of the included gyroscopic means is mounted on gimbal part 11 with freedom about a normally horizontal axis 17 perpendicular to the gimbal axis 15. Also, the rotor part 14 is mounted on the frame member 12 to spin about a normally horizontal axis 18 perpendicular to the frame member axis 17. The gimbal error compensated for by the improved system results from the inclusion in the system of the stabilizing gyroscopic means as hereinafter described.

The A.C. polycircuit transmission line of the improved system is represented as a three circuit, three branch line whose respective branches are designated as leads 20, 21 and 22. The electrical transmitter or input synchro element of the system is indicated at 23. As shown in FIG. 1, the stator part 24 of the synchro includes three circuit windings that are connected in Y-relation across the branches or leads 20, 21 and 22 of the line. The rotor part 25 of the synchro 23 is operatively connected to the gimbal 11 by shafting 26. The winding of the rotor part 25 is also connected to a suitable A.C. source of supply 27 by way of leads 28 and 29. As the stator 24 is fixed in relation to the craft, it moves with the craft in relation to the rotor part 25 to provide a heading data input to the line in the embodiment of the invention shown in the drawing. For a particular craft heading with respect to the gyroscopic means 10, the relative angular positions of the transmitter or synchro parts of the system are such as to provide an electrical input to the line indicated as the heading angle $\Omega$.

For a particular arrangement between the gyroscopic and transmitter elements of the system where for example the rotor spin axis 18 is in alignment with the fore and aft axis of the craft at zero and 180 degrees craft heading and is in alignment with the pitch axis of the craft at 90 and 270-degree craft heading, there is no error in the input to the line from transmitter 23 with tilt of the gimbal 11 with the craft upon departure of the craft from a level condition about its roll axis. In the first of the noted relations, the gimbal 11 moves with the craft about the axis of spin 18 of the rotor 18 so that no disturbing torque is exerted to influence the orientation of the gimbal 11 erroneously. In the second of the noted relations, the gimbal 11 moves with the craft about the axis 17 of the frame member 17 so that the same result is obtained and the heading output data $\Omega$ is free of gimbal error. Between the noted angular relations, the gyroscopic parts offer restraint to the roll motions of the craft which varies as shown in FIG. 3 depending on the angular relation of the craft with respect to the stabilized gimbal 11 and the tilt of the craft about its roll or fore and aft axis or about an axis normal to the axis 15 of the gimbal. The curves for roll axis tilts of 10, 20, 30, 40 and 50 degrees show that the gimbal error at the transmitter or synchro 23 reaches a maximum value where the spin axis 18 of the gyroscopic means is located in approximately 45-degree spaced relation to the fore and aft and pitch axes of the craft. The curves show that the error is two cycle in character being alternately positive and negative in value. The magnitude of the error is also demonstrated to be dependent on the extent of the angle of tilt of the craft about its roll axis. The duplicating curves for the heading range 180 to 0 degrees of the system are not included in FIG. 3.

The receiver or output synchro of the transmission line is indicated at 30. The stator part 31 of the receiver 30 is fixed in relation to the craft. Stator part 31 includes windings that are connected in Y-relation across the branches or leads of the line to the corresponding stator part 24 of the transmitter or input synchro 23. The rotor part 32 of receiver 30 includes a winding that provides an output when its orientation with respect to the craft differs from the orientation between the rotor part 25 and the craft. Where the output data is heading as represented by the angle $\alpha$ in the drawing, the rotor part 32 may be operatively connected to a compass card 33 through shafting 34 and its winding connected to operate a motor 35 that drives the shafting 34 by way of leads 36, 37, amplifier 38 and leads 39, 40. The card 33 includes azimuth indicia that is read in relation to an index 41 which is fixed to the craft to move with it as the craft turns or yaws. In the described system, the card 33 is stabilized in azimuth by the included gyroscopic means and the craft moves with index 41 and with respect to the gimbal as it yaws in maneuvering from one heading to another heading. Where the maneuver is accomplished without banking the craft and its roll angle remains zero degrees, the heading angle $\Omega$ into the line from the transmitter 23 is the same as the heading angle $\alpha$ at the receiver 30. Under conditions where the line includes gimbal error introduced therein at the transmitter 23, the improved system compensates the receiver 30 for the gimbal error input of the transmitter 23 so that the output angle $\alpha$ is correctly representative of the heading of the craft during the maneuver. Here, the difference between the angle $\Omega$ and $\alpha$ corresponds to the gimbal error caused in the system by the included gyroscopic means.

In accordance with the present invention, the error is cancelled by changing the voltage of one of the branches of the system to control the current in the line. As shown, the means for effecting this result and providing the required compensation includes a network of resistors 42, 43 and 44 that are connected in Y-relation across the branches or leads 20, 21 and 22 of the polycircuit or three circuit transmission line by way of lead 45 to branch or lead 20, lead 46 to branch or lead 21 and lead 47 to branch or lead 22. The means further includes voltage amplifying means 48 with an output in branch or lead 20 in FIG. 1 that is connected in input relation across the network resistor 42 of the compensating one of the branches of the line by lead 49 and lead 45. In the improved system, the compensating voltage for the branch 20 is changed as a function of the tilt of the craft about its roll axis by varying the gain of the amplifier 48. The gain control input to the amplifier is provided by suitable means having a roll angle $\phi$ output in the form of a gyro vertical 50 whose gimbal 51 is mounted on the craft with its axis 52 corresponding with or parallel to the fore and aft craft axis or axis normal to gimbal axis 15 of the directional gyro 10. The output synchro 53 includes a rotor part 54 that is operatively connected to the gimbal 51 by shafting 55. The winding of the rotor part is also connected to the A.C. source 27 by way of leads 56, 57. As the craft banks, the stator part 58 of synchro 53 moves with the craft in relation to the relatively fixed rotor part 54 to produce an output whose magnitude and sense depends on the tilt angle $\phi$ and its direction with respect to the level established by the gyro vertical 50. The output $\phi$ is fed as a gain control input to amplifier 48 by way of leads 59, a cos $\phi$ function generator 60 and lead 61. The amplifier 48 accordingly provides the required compensating voltage in the transmission branch 20 to correct the system for the gimbal error input thereto. In the arrangement shown in FIG. 1, the amplifier 48 is connected in series in the compensating branch of the system between the resistor network 42, 43, 44 and the receiver 30.

In the embodiment of the invention shown in FIG. 2, the provided compensating means includes a transformer 62 that couples the amplifier 48 to the branch 20 of the line. Here the output winding 63 of the transformer 62 is connected in series in the branch or line 20 between the resistor network 42, 43, 44 and the receiver or output synchro 30. As shown, the input winding 64 of the transformer 62 is connected to the output of the amplifier 48 by way of leads 65, 66. In this form of the invention, it is not necessary to feed the transmission signal in branch 20 through the amplifier 48 when the tilt angle is zero and there is no compensating input to the line.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a gyroscopically stabilized data transmission system for maneuverable craft; gyroscopic means of the type having a gimbal with freedom about an axis fixed in relation to the craft, and a member mounted on the gimbal with freedom about an axis perpendicular to the gimbal axis having a rotor spinning about an axis perpendicular to the member axis; an A.C. transmission line of the polycircuit branch type having a transmitter with a part fixedly connected to the gimbal and a part fixed in relation to the craft providing a data input with gimbal error depending on the angular relation to the craft with respect to the stabilized gimbal and the tilt of the craft about an axis normal to the gimbal axis, and a receiver providing a data output having a part connected in the line to one of the parts of the transmitter; and means for changing the voltage of one of the branches of the line to compensate the output of the receiver for the gimbal error input of the transmitter including a network of resistors connected across each of the branches of the line, a voltage amplifier of the variable gain type connected in input relation across the resistor of the one branch of the line, and means for varying the gain of the amplifier as a function of the tilt of the craft about an axis normal to the gimbal axis.

2. A system as claimed in claim 1, in which the line is a three circuit, three branch line, the resistor network is connected in Y-relation across the branches of the line and the amplifier is connected in series in the compensating branch between the network and the receiver.

3. A system as claimed in claim 1, in which the compensating means includes a transformer with an output winding connected in series in the compensating branch of the line between the network and receiver and an input winding connected to the amplifier.

4. In a gyroscopically stabilized data transmission system for maneuverable craft, gyroscopic means of the directional type having a gimbal with freedom about a normally vertical axis in relation to the craft, and a frame mounted on the gimbal with freedom about a normally horizontal axis perpendicular to the gimbal axis having a rotor spinning about a normally horizontal axis perpendicular to the frame axis; an A.C. transmission line of the polycircuit branch type having an input synchro with a part operatively connected to the gimbal and a part fixed in relation to the craft providing a heading data input with gimbal error depending on the angular relation of the craft with respect to the stabilized gimbal and the tilt of the craft about its roll axis, and an output synchro having a part connected in the line to one of the parts of the input synchro; and means for controlling the voltage of one of the branches of the line to compensate the output synchro for the gimbal error input of the input synchro including a network of resistors connected across each of the branches of the line, amplifying means of the variable gain voltage type connected in input relation across the resistor for the one branch of the line, and means for varying the gain of the amplifying means as a cosine function of the tilt of the craft about its roll axis.

5. A system as claimed in claim 4, in which the line is a three circuit, three branch line, the line connected parts of the synchros are three circuit stators with windings connected in Y-relation across the branches of the line fixed in relation to the craft, and the resistor network is connected in Y-relation across the branches of the line.

6. A system as claimed in claim 5, in which the compensating means includes a transformer with a secondary winding connected in series in the compensating branch of the line between the network and output synchro and a primary winding connected to the amplifying means.

7. In a gyroscopically stabilized data transmission system for maneuverable craft, gyroscopic means of the directional type having a gimbal with freedom about a normally vertical axis in relation to the craft, and a frame mounted on the gimbal with freedom about a normally horizontal axis perpendicular to the gimbal axis having a rotor spinning about a normally horizontal axis perpendicular to the frame axis; an A.C. transmission line with three branches having an input synchro with a rotor operatively connected to the gimbal and a stator having windings connected in Y-relation across the branches of the line providing a heading data input with gimbal error depending on the angular relation of the craft with respect to the stabilized gimbal and the tilt of the craft about its roll axis, and an output synchro with a stator having windings connected in Y-relation across the branches of the line to the stator of the input synchro; and means for controlling the voltage of one branch of the line to compensate the output synchro for the gimbal error input of the input synchro including a network of three equal resistances connected in Y-relation across the respective branches of the line, a voltage amplifier of the variable gain type connected in input relation across the resistance for the one branch of the line, and means for varying the gain of the amplifier as a cosine function of the tilt of the craft about its roll axis.

8. A system as claimed in claim 7, in which the compensating means includes a transformer for coupling the amplifier to the control branch of the line.

References Cited by the Examiner
UNITED STATES PATENTS

| 2,460,798 | 2/1949 | McCarthy | 33—224 X |
| 2,464,544 | 3/1949 | Agins | 33—224 |
| 2,581,436 | 1/1952 | McCarthy | 33—224 X |
| 2,753,498 | 7/1956 | Gray | 33—224 X |
| 2,796,568 | 6/1957 | Gray | 318—30 |

ROBERT B. HULL, *Primary Examiner.*